United States Patent
Fiveland et al.

(10) Patent No.: US 11,125,147 B2
(45) Date of Patent: Sep. 21, 2021

(54) PRECHAMBER IGNITION SYSTEM HAVING HYDRAULICALLY ACTUATED PISTON

(71) Applicant: Caterpillar Inc., Deerfield, IL (US)

(72) Inventors: Scott B. Fiveland, Washington, IL (US); Dana Ray Coldren, Secor, IL (US)

(73) Assignee: Caterpillar Inc., Peoria, IL (US)

( * ) Notice: Subject to any disclaimer, the term of this patent is extended or adjusted under 35 U.S.C. 154(b) by 195 days.

(21) Appl. No.: 16/437,870

(22) Filed: Jun. 11, 2019

(65) Prior Publication Data

US 2020/0392892 A1     Dec. 17, 2020

(51) Int. Cl.
    *F02B 19/06*     (2006.01)
    *F02B 19/14*     (2006.01)

(52) U.S. Cl.
    CPC .............. *F02B 19/06* (2013.01); *F02B 19/14* (2013.01)

(58) Field of Classification Search
    CPC .............................. F02B 19/06; F02B 19/1071
    See application file for complete search history.

(56) References Cited

U.S. PATENT DOCUMENTS

| | | | |
|---|---|---|---|
| 2,148,458 A * | 2/1939 | Grahman | F02B 1/12 123/143 A |
| 4,075,996 A * | 2/1978 | Hisserich | F02B 7/02 123/143 A |
| 4,384,553 A * | 5/1983 | Schechter | F02B 19/06 123/143 A |
| 4,413,781 A | 11/1983 | Iwata | |
| 5,315,973 A | 5/1994 | Hill et al. | |
| 5,862,792 A | 1/1999 | Paul et al. | |
| RE39,373 E | 11/2006 | Yudanov et al. | |
| 7,341,205 B2 | 3/2008 | Nozaki et al. | |
| 9,739,192 B2 | 8/2017 | Willi | |
| 2003/0116121 A1 | 6/2003 | Agama et al. | |
| 2005/0072400 A1 | 4/2005 | Kojic et al. | |
| 2014/0175192 A1 | 6/2014 | Hou | |
| 2015/0369192 A1 | 12/2015 | Ge et al. | |
| 2016/0123286 A1 | 5/2016 | Hou | |
| 2016/0230645 A1 | 8/2016 | Schock et al. | |
| 2019/0353088 A1 | 11/2019 | Ketterer | |
| 2020/0116074 A1 * | 4/2020 | Chang | F02B 19/108 |

FOREIGN PATENT DOCUMENTS

| | | | |
|---|---|---|---|
| DE | 3117133 | 11/1982 | |
| FR | 432999 A | * 12/1911 | ............ F02B 19/06 |
| WO | WO-2005040576 A1 | * 5/2005 | ............ F02B 77/085 |

OTHER PUBLICATIONS

Otto, FR 432,999, machine translation. (Year: 1911).*
GB2008378.8, search report. (Year: 2020).*

* cited by examiner

*Primary Examiner* — Hung Q Nguyen
*Assistant Examiner* — Mark L. Greene
(74) *Attorney, Agent, or Firm* — Brannon Sowers & Cracraft

(57) ABSTRACT

An ignition system for an internal combustion engine includes an igniter having an igniter housing with a combustion prechamber formed therein, and a piston movable within the igniter housing to increase a pressure of an ignition charge of fuel and air within the combustion prechamber to an autoignition threshold. The ignition system includes a hydraulic actuator to apply an actuating force to the piston. Related methodology is disclosed.

15 Claims, 4 Drawing Sheets ate to an ignition
PRECHAMBER IGNITION SYSTEM HAVING HYDRAULICALLY ACTUATED PISTON

TECHNICAL FIELD

The present disclosure relates generally to an ignition system for an internal combustion engine, and more particularly to a prechamber ignition system having a hydraulically actuated piston to autoignite an ignition charge in a prechamber.

BACKGROUND

Internal combustion engines are well known and widely used throughout the world in applications ranging from power generation to providing rotational power for vehicle propulsion or operating machinery, and for various other applications. Great diversity can be seen in the types of fuels on which internal combustion engines operate, and the mechanism and manner in which fuels are ignited for combustion. In one class of ignition strategies, a mixture of fuel and air is increased in pressure within a combustion cylinder in an engine to an autoignition threshold. An electrical spark is employed to ignite a mixture of fuel and air typically at pressures below an autoignition threshold in other strategies. Still other techniques employ prechamber ignition, where a mixture of fuel and air is ignited in a prechamber device that is fluidly connected to a main combustion chamber in the engine and produces a relatively robust combustion reaction in the prechamber, resulting in jets of hot combustion gases directed into the cylinder to ignite a main charge of fuel and air.

Prechamber gaseous fuel engine ignition devices typically employ a sparkplug that ignites fuel and air, with the fuel supplied into the prechamber either by a dedicated feed from a fuel supply, or from the main combustion chamber by way of the same outlets through which the hot combustion gases are later discharged to ignite the main charge. All of these general ignition strategies have certain advantages and certain drawbacks depending upon the application. One known prechamber ignition strategy is taught in U.S. Pat. No. 9,739,192 to Willi.

SUMMARY OF THE INVENTION

In one aspect, an ignition system for an internal combustion engine includes an igniter having an igniter housing with a combustion prechamber formed therein, and at least one gas orifice structured to fluidly connect the combustion prechamber to a cylinder in the internal combustion engine. The igniter further includes a piston having a piston end face exposed to the combustion prechamber, and movable within the igniter housing between a retracted position and an advanced position. The ignition system further includes a hydraulic actuator structured to apply an actuating force to the piston, such that the piston is moved toward the advanced position to increase a pressure of an ignition charge of fuel and air within the combustion prechamber to an autoignition threshold.

In another aspect, an internal combustion engine includes a fuel supply, and an engine housing having a main combustion chamber formed therein. The internal combustion engine further includes an ignition system having an igniter with a combustion prechamber formed therein, and at least one gas orifice fluidly connecting the combustion prechamber to the main combustion chamber. The igniter further includes a piston having a piston end face exposed to the combustion prechamber, and being movable within the igniter housing between a retracted position and an advanced position. The ignition system further includes a hydraulic actuator structured to apply an actuating force to the piston, such that the piston is moved toward the advanced position to increase a pressure of an ignition charge of fuel and air within the combustion prechamber to an autoignition threshold.

In still another aspect, a method of operating an engine includes moving an engine piston in an engine toward a top dead center position to increase a pressure of a main charge of fuel and air in a main combustion chamber. The method further includes fluidly connecting a hydraulic chamber in an igniter to a supply of pressurized hydraulic fluid, and applying a pressure of the pressurized hydraulic fluid to a hydraulic actuation surface of an igniter piston exposed to the hydraulic chamber to cause the igniter piston to move toward an advanced position. The method further includes increasing a pressure of an ignition charge of fuel and air in a combustion prechamber of the igniter to an autoignition threshold based on the moving of the igniter piston toward the advanced position. The method still further includes conveying combustion gases of the ignition charge from the combustion prechamber into the main combustion chamber, and igniting the main charge within the main combustion chamber by way of the combustion gases of the ignition charge.

DETAILED DESCRIPTION

Figure 1:
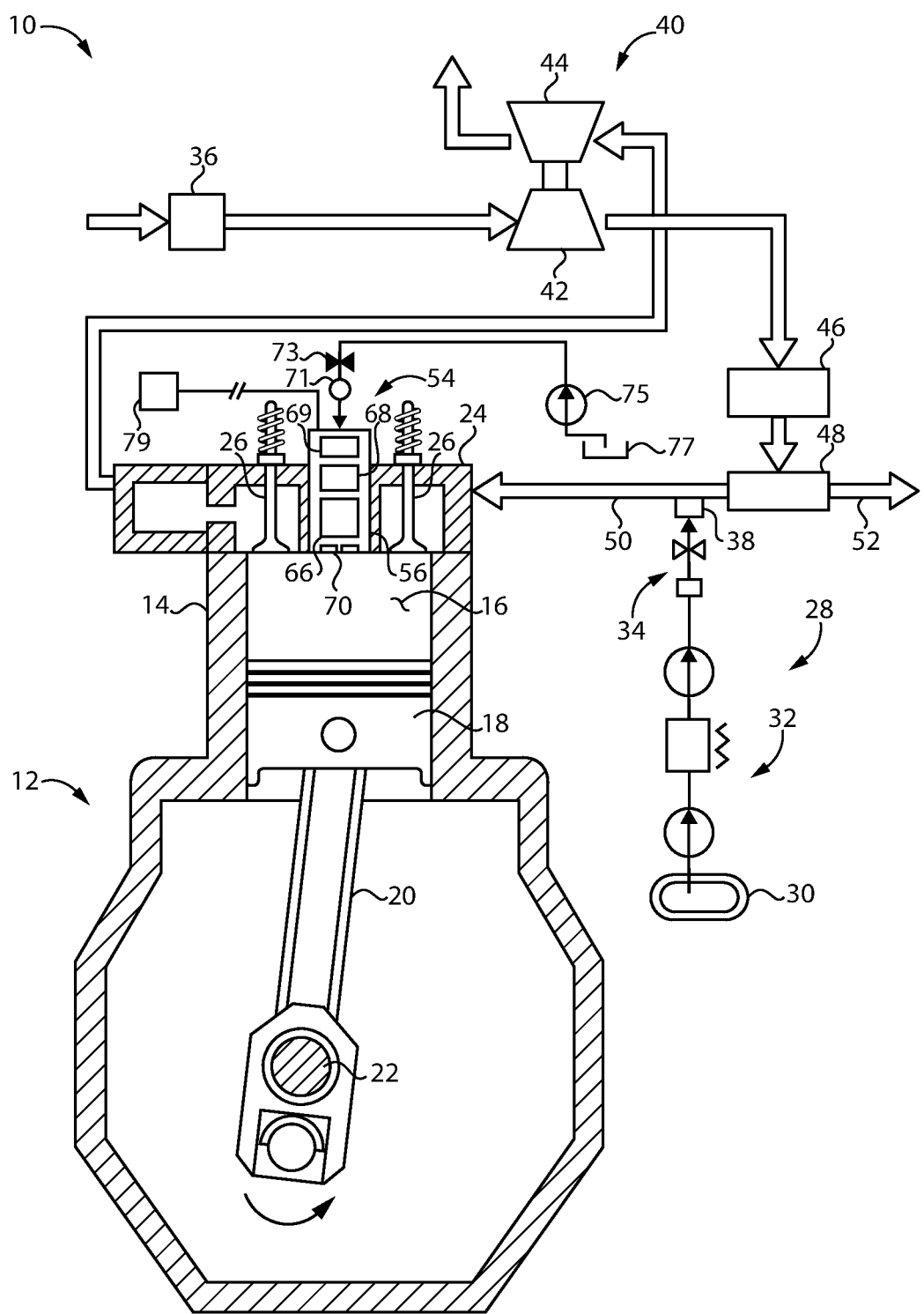
FIG. 1 is a partially sectioned side diagrammatic view of an internal combustion engine system, according to one embodiment.

Referring to FIG. 1, there is shown an internal combustion engine system 10, according to one embodiment, and including an internal combustion engine 12 having an engine housing 14 with a cylinder or main combustion chamber 16 formed therein. An engine piston 18 is positioned within cylinder 16, and movable between a top dead center position and a bottom dead center position in a conventional four-cycle pattern. A connecting rod 20 couples piston 18 with a crankshaft 22. An engine head 24 is attached to engine housing 14 and has a plurality of gas exchange valves 26 movable therein to control intake and exhaust of engine 12 in a generally conventional manner. Engine 12 could include any number of cylinders each equipped with a piston and arranged in any suitable configuration such as an in-line configuration or a V-configuration. Engine 12 may be structured to operate on any of a variety of gaseous fuels that have a gaseous state at standard temperature and pressure, including natural gas, methane, propane, biogas, landfill gas, mine gas, blends of these, or still others, or fuels transformed from liquid to gas upstream of a combustion chamber, such as premixed gasoline, ether, alcohol, or others. Port-injected or carbureted gasoline or ethanol applications are contemplated, for instance.

To this end, engine system 10 may include a fuel system 28 having a gaseous fuel supply 30, and vaporization and pressurization equipment 32 in the nature of a vaporizer and at least one pump, structured to receive gaseous fuel in a pressurized gaseous state or a cryogenically stored liquid state, and convey the gaseous fuel to engine 12 for combustion in cylinder 16. Tank pressure management could be used as an alternative to a pump in some instances. Engine system 10 further includes an air inlet 36 structured to receive intake air, and a turbocharger 40 positioned fluidly between air inlet 36 and engine housing 14. Turbocharger 40 can include a compressor 42, and a turbine 44. An aftercooler 46 or the like may be positioned fluidly between turbocharger 40 and an intake manifold 48. An intake runner 50 extends from intake manifold 48 to engine housing 14. A second intake runner 52 is also illustrated and will be understood to extend to another cylinder (not shown) of engine 12. In the illustrated embodiment a gas inlet 38 is positioned to supply gaseous fuel into intake runner 50, by way of a gaseous fuel admission valve 34. In other embodiments, a gaseous fuel admission valve might be structured to admit gaseous fuel into intake manifold 48, or potentially at a location upstream of compressor 42, for an example. In still other embodiments, gaseous fuel could be directly injected into cylinder 16. In a practical implementation strategy, operation of engine system 10 can include operation using a stoichiometrically lean mixture of gaseous fuel and air having an equivalence ratio of about 1, or less, and in some embodiments an equivalence ratio of about 0.6, or less. Stoichiometrically lean fuel and air mixtures can sometimes be relatively challenging to reliably and optimally ignite, and prechamber ignition devices have been employed for engine ignition purposes in this context. Spark-ignited prechamber ignition devices utilize spark production within a prechamber. It has been observed that sparkplugs may require servicing or experience performance degradation sooner than desired. As will be further apparent from the following description, prechamber ignition strategies according to the present disclosure employ compression ignition of an ignition charge of fuel and air and are contemplated to have an extended service life in comparison to spark-ignition prechamber strategies.

Engine 12 also includes an ignition system 54 having an igniter 56 positioned within engine housing 14 and having at least one gas orifice 70 structured to fluidly connect a combustion prechamber in igniter 56 with cylinder 16. Igniter 56 includes a piston 66, a hydraulic actuator 68 for piston 66, and a control valve assembly 69 for actuator 68, details of which are further discussed herein. Ignition system 54 may also include a pressurized fluid reservoir 71 storing pressurized hydraulic actuation fluid, a low pressure fluid supply or tank 77, and at least one pump 75 structured to pressurize hydraulic actuation fluid and supply the same to pressurized fluid reservoir 71 by way of a valve 73. Pressurized fluid reservoir 71 could be a shared fluid reservoir, such as a common rail or the like, that stores a volume of pressurized hydraulic actuation fluid for supplying to a plurality of actuators in a plurality of igniters each associated with one of a plurality of cylinders in engine 12. A dedicated unit pump or the like could be used for each igniter in engine 12 instead of a shared pressurized fluid reservoir. An electronic control unit 79, including any suitable computerized control unit, is coupled with control valve assembly 69 to control supplying of pressurized fluid for hydraulic actuation of hydraulic actuator 68, as further discussed herein.

Figure 2:
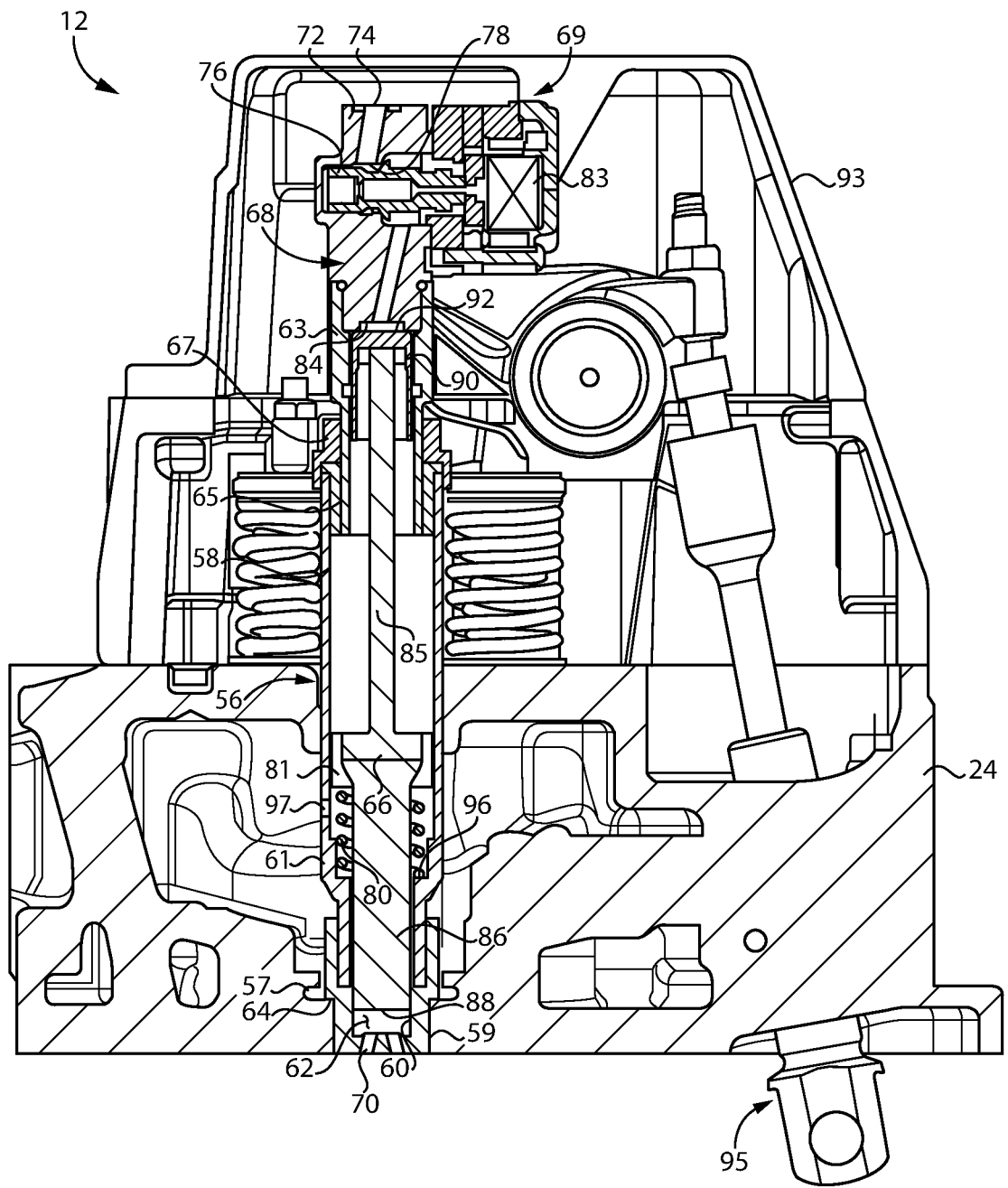
FIG. 2 is a sectioned side diagrammatic view of a portion of the engine system of FIG. 1 including an ignition system.

Referring also now to FIG. 2, there are shown aspects of engine 12 and igniter 56 in greater detail. Igniter 56 includes an igniter housing 58 supported in engine head 24. In the illustrated embodiment, igniter housing 58 includes a plurality of housing pieces including a nozzle 59, a body piece 61, an actuator housing piece 63, a body piece 65, and a body piece 67. Body piece 61 extends between nozzle 59 and actuator housing piece 63, and in the illustrated embodiment is coupled to actuator housing piece 63 by way of body piece 65 and body piece 67. A combustion prechamber 62 is formed in igniter housing 58, and at least one gas orifice 70, typically a plurality of gas orifices 70, fluidly connects combustion prechamber 62 to cylinder 16. Igniter 56 further includes piston 66, and piston 66 has a piston end face 88 exposed to combustion prechamber 62. Piston end face 88 is a terminal end face of piston 66 in the illustrated embodiment. Piston 66 is movable within igniter housing 58 between a retracted position, approximately as depicted in FIG. 2, and an advanced position. Igniter 56 also includes hydraulic actuator 68 which is structured to apply an actuating force to piston 66, such that piston 66 is moved toward the advanced position to increase a pressure of an ignition charge of gaseous fuel and air within combustion prechamber 62 to an autoignition threshold. In other embodiments rather than separate nozzle and body pieces at least some of these parts could be integrated. Also shown in FIG. 2 is a coolant channel 57 formed by engine head 24 and extending circumferentially around nozzle 59 to circulate coolant fluid in contact with nozzle 59, and thereby assist in dissipating heat of prechamber combustion as well as heat of main combustion chamber (cylinder) combustion. It will be appreciated that piston 66 is positioned and oriented to reciprocate in-line within piston 18, having parallel directions of reciprocation and also being substantially coaxial with one another. The present disclosure is not thereby limited, however, and in some instances piston 66 and igniter 56 itself could be offset from an axis of reciprocation of piston 18, oriented diagonally, or have some other arrangement. It will also be appreciated that nozzle 59 in part defines cylinder 16, such that igniter housing 58 is in part exposed to cylinder 16. In some embodiments nozzle 59 might be configured to extend into cylinder 16.

Piston 66 may further include a first piston head 86 that includes piston end face 88, and a second piston head 90 coupled to first piston head 86. Igniter 56 may also include a piston guide 81 attached to piston 66 between first piston head 86 and second piston head 90. Guide 81 may be structured such that it slidably contacts igniter housing 58, in particular having sliding contact with an interior surface of hollow body piece 61 of igniter housing 58 as piston 66 is moved between its retracted position and its advanced position. Other mechanisms for guiding movement of piston 66 are contemplated, as further discussed herein. Piston end face 88 is within combustion prechamber 62 at each of the retracted position and the advanced position. Piston end face 88 is spaced from gas orifices 70 at the advanced position, such that gas orifices 70 are open to cylinder 16 and to combustion prechamber 62 at the advanced position of piston 66. Igniter 56 may also include a biaser 80, such as a coil spring biaser, held in compression in igniter housing 58 and biasing piston 66 toward the retracted position in opposition to an actuating force produced by actuator 68.

Biaser 80 is further compressed in response to moving piston 66 from the retracted position toward the advanced position.

Igniter housing 58 also includes a hydraulic chamber 84 formed therein, and piston 66 includes a hydraulic actuation surface 92 exposed to hydraulic chamber 84, formed on second piston head 90 and positioned opposite to first piston end face 88. Actuator 68 further includes a hydraulic fluid port 74 formed therein, and control valve assembly 69 includes a control valve member 76 movable between an open position where hydraulic fluid port 74 is fluidly connected to hydraulic chamber 84, and a closed position. An electrical actuator 83, such as a solenoid electrical actuator, is coupled with control valve member 76 by way of an armature 91, and varied in electrical energy state by way of electronic control unit 79. Hydraulic fluid port 74 may fluidly connect to pressurized fluid reservoir 71, for example. Also in the illustrated embodiment valve member 76 includes a poppet control valve member movable between the open position, and a closed position at which valve member 76 contacts a valve seat 78 formed in a valve body 72 of control valve assembly 69 and hydraulic actuator 68. Hydraulic actuator 68, and including valve body 72, is resident in igniter 56 in the illustrated embodiment, however, it should be appreciated that in other instances hydraulic actuator 68 or parts thereof could be physically separated from other parts of igniter 56. As described herein hydraulic actuator 68 may be understood to include second piston head 90 and control valve assembly 69. In other instances, a hydraulic actuator could include some mechanism structured to apply a force to a component intervening between a control valve and the piston desired to be actuated, not part of the piston itself. An elongate rod 85 extends between first piston head 86 and second piston head 90, and piston 66 itself may be made up of at least three separate pieces, namely, first piston head 86, second piston head 90, and elongate rod 85. Piston 66 could be formed, however, as a single integrated piece. It should also be appreciated that igniter 56 may be designed to fit within existing packaging constraints, and is generally elongate so as to be received in existing engine head designs potentially in place of or in the same space that would have been otherwise occupied by a spark-ignition prechamber ignition device in a prior design. In the illustrated embodiment, igniter 56 is positioned within a bore in engine head 24 and fits under a valve cover 93 attached to engine head 24. In other instances, igniter 56 might not be elongated, or less so, and/or packaged differently. A rocker arm assembly 95 is shown in proximity to igniter 56 in FIG. 2 and operates gas exchange valves 26 in a generally conventional manner.

Figure 3:
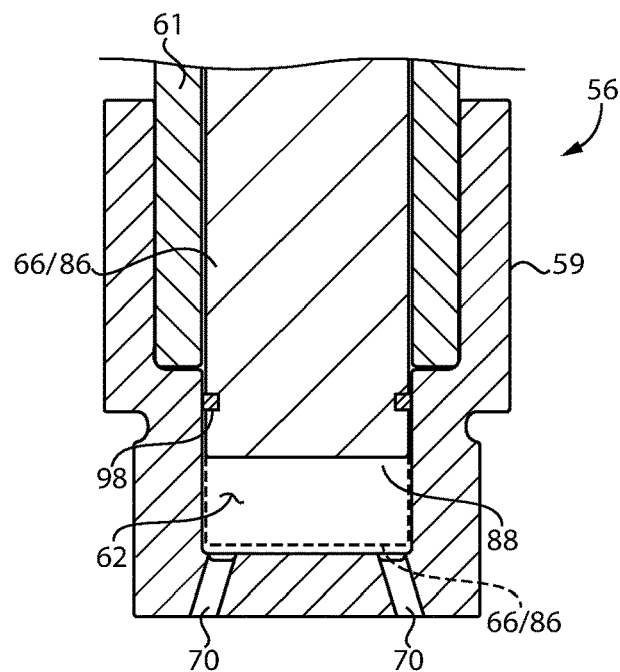
FIG. 3 is a sectioned side diagrammatic view of portions of the ignition system of FIG. 2.

Referring also now to FIG. 3, there is shown an enlarged view of a portion of igniter 56 including nozzle 59. In FIG. 3 piston 66 is shown as it might appear at its retracted position, but shown in phantom as it might appear at its advanced position. It can be noted that at the advanced position of piston 66 piston end face 88 will remain spaced from inside surfaces of nozzle 59, and would not block gas orifices 70, as discussed above. Piston 66 may be stopped from travel prior to reaching an inside end of nozzle 59, such as by closing seat 78 with valve member 76, by compression of biaser 80 to a hard stop or a compression state amongst its coils sufficient to fully oppose the hydraulic actuation force, by hitting a physical stop, hydraulic snubbing, or by combinations of these. Also shown in FIG. 3 is a piston ring 98 attached to piston 66 to limit blowby of combustion gases from prechamber 62 between piston 66 and igniter housing 58. As shown in FIG. 2, igniter housing 58 may have a blowby vent 97 formed therein for venting blowby gases out of igniter 56, for example, into engine head 24. In other embodiments, rather than one or more piston rings, piston 66 and nozzle 59 could be machined to sufficiently tight tolerances that blowby phenomena are acceptably managed, although a blowby vent might still be used. In such an embodiment, a clearance between piston 66 and nozzle 59 could serve as a guide clearance for piston 66, with a clearance between first piston head 86 and igniter housing 58 being relatively tighter than a clearance between second piston head 90 and igniter housing 58, in particular actuator housing 63 in the illustrated embodiment.

Figure 4:
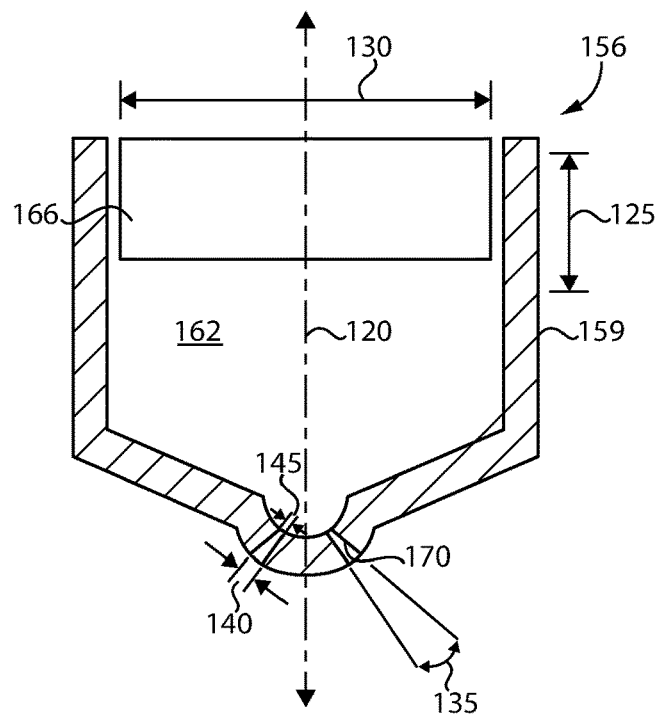
FIG. 4 is a sectioned side diagrammatic view of portions of an ignition system, according to one embodiment.

Referring now to FIG. 4, there are shown portions of an igniter 156 according to another embodiment and including a nozzle 159 having a plurality of gas orifices 170 formed therein. Discussion herein of features or functionality of any one embodiment should be understood by way of analogy to refer to features or functionality of other embodiments except where otherwise stated or apparent from context. Gas orifices 170 extend between inner and outer nozzle surfaces (not numbered) of nozzle 159, and each has a flow area that is increased between the inner nozzle surface and the outer nozzle surface to pre-expand outgoing combustion gases of the ignition charge. Nozzle 159 also has a combustion prechamber 162 formed therein, and a hydraulically actuated piston 166 is structured to increase a pressure of an ignition charge of fuel and air within combustion prechamber 162 to an autoignition threshold. An inner dimension 145 of each gas orifice may be less than an outer dimension 140, and gas orifices 170 may increase in flow area in an outward direction from prechamber 62, and define an angle 135. Angle 135 may be less than 45°, and typically less than 30° approximately as depicted in FIG. 4. A ratio of the size of outer opening dimension 140 to the size of inner opening dimension 145 may be from about 1.5:1 to about 2:1. A diameter dimension 130 of piston 166 might be about 20 millimeters, and a travel distance or stroke distance 104 of piston 166 may be less than about 25 millimeters, and potentially about 15 millimeters, in an engine having a bore size of about 170 millimeters. General proportions along these lines can be expected to scale. Hence, another engine example might have an igniter with a diameter dimension of about 20×, a piston travel distance of less than about 25×, and potentially about 15×, where the dimensional attributes are defined analogously to those of the embodiment of FIG. 4 and others disclosed herein. It is contemplated that a travel speed of igniter piston 166 may be less than a travel speed of engine piston 18 in cylinder 16 during any given engine cycle, for example about 2 meters per second, or less. The term "about" should be understood in the context of conventional rounding to a consistent number of significant digits. Accordingly, "about 2" means from 1.5 to 2.4, and so on.

INDUSTRIAL APPLICABILITY

Referring to the drawings generally, operating engine 12 includes moving engine piston 18 in engine 12 in an engine cycle toward a top dead center position to increase a pressure of a main charge of fuel and air in main combustion chamber or cylinder 16. During moving engine piston 18 toward the top dead center position the fuel and air in cylinder 16 can be conveyed into prechamber 62. In an embodiment with direct feed of fuel, the fuel can be conveyed into prechamber 62 by way of dedicated fuel supply line. Control valve assembly 69 may be actuated at a suitable timing in the engine cycle to fluidly connect hydraulic chamber 84 to hydraulic fluid port 74. Fluidly connecting hydraulic chamber 84 in this manner allows applying of a pressure of pressurized hydraulic fluid from hydraulic chamber 84 to hydraulic actuation surface 92 that is exposed to hydraulic chamber 84, and causes igniter piston 66 to move toward an advanced position. Moving igniter piston 66 toward the advanced position increases a pressure of the ignition charge of fuel and air in combustion prechamber 62 to an autoigniton threshold.

In some instances the fuel and air forming the ignition charge in prechamber 62 may be urged into combustion prechamber 62 by the upward travel of engine piston 18 and/or upward travel of igniter piston 66. Additionally, or alternatively, fuel could be supplied directly into combustion prechamber 62 such as by way of a dedicated fuel supply line in engine head 24. When the pressure of the ignition charge is increased to the autoignition threshold, the fuel and air will autoignite in combustion prechamber 62, and trigger a rapid increase in pressure and temperature therein. Combustion gases of the ignition charge having ignited within prechamber 62 form flame jets that advance outwardly of nozzle 59 into main combustion chamber or cylinder 16. The flame jets will ignite the main charge of fuel and air within cylinder 16 according to well-known principles. Piston ring 98, or potentially a plurality of piston rings, can limit blowby of combustion gases past piston 66 during operation.

Figure 5:
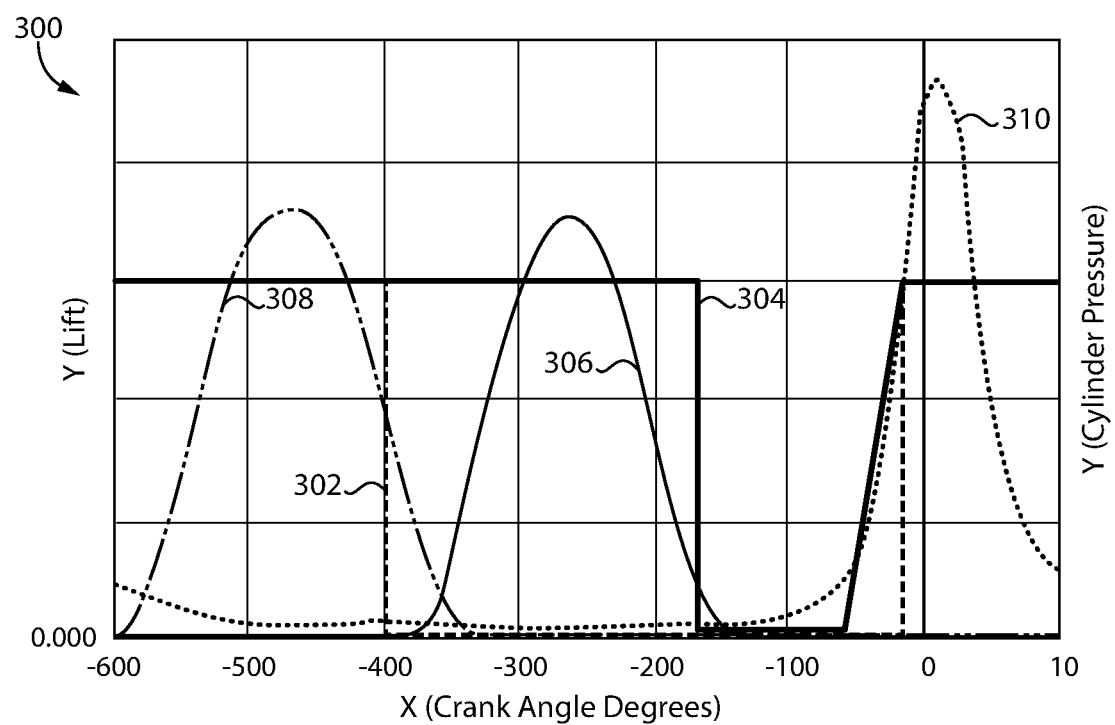
FIG. 5 is a graph of actuator lift for engine actuators and cylinder pressure in comparison with crank angle degree location.

Referring to FIG. 5, there are shown certain aspects of operation according to the present disclosure and including crank angle degrees on the X-axis, and lift and cylinder pressure on the left Y-axis and right axes, respectively. A first trace 302 shows prechamber piston lift, for example operation at about 200 RPM engine speed. Another trace 304 shows prechamber piston lift that might be observed at about 1400 RPM engine speed. Prechamber piston lift means lift from a rest or retracted position, in other words at a full lift state piston 66 is fully retracted, and at a minimum lift state piston 66 is fully advanced. Intake valve lift is shown at a trace 306, and exhaust valve lift is shown at a trace 308. Cylinder pressure is shown at yet another trace 310.

It can be noted that at the relatively slower engine speed of about 200 RPM trace 302 shows that piston 66 is moved from the advanced position to the retracted position at about −400° crank angle, and then moved to the advanced position to autoignite the ignition charge at a timing a few degrees before 0° crank angle. Trace 304 shows that at the relatively faster engine speed of about 1400 RPM piston 66 is moved from the advanced position to the retracted position at −180°, and then commences moving to the advanced position at about −50° to autoignite the ignition charge. The timings and relative timings of events shown in FIG. 5 are illustrative only.

Although not strictly limited, in many applications it will be desirable for piston 66 to autoignite the ignition charge a few degrees before top dead center, such that flame jets will advance outwardly of nozzle 59 at approximately 0° crank angle, regardless of engine speed. Since igniter 56 can be controlled independently of engine speed, it will generally be possible and desirable to vary speed and/or timing of piston 66, such as by varying a timing of actuating control valve assembly 69 and/or varying a pressure of the hydraulic actuating fluid in pressurized fluid reservoir 71. Since intake valve and exhaust valve actuation may be fixed relative to engine speed, but igniter operation is not, variations in control valve timing and/or varying of the actuating force applied to piston 66 can be used to phase igniter piston 66 independently of engine piston 18. In view of the present description those skilled in the art will visualize various other ways in which the timing of events in igniter 56 can be varied relative to the timing of events in internal combustion engine system 10.

The present description is for illustrative purposes only, and should not be construed to narrow the breadth of the present disclosure in any way. Thus, those skilled in the art will appreciate that various modifications aright be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having" or the like are intended to be open-ended terms. Further, the phrase "based on" is intended to mean "based, at least in part, on" unless explicitly stated otherwise.

What is claimed is:

1. An ignition system for an internal combustion engine comprising:

an igniter including an igniter housing having a combustion prechamber formed therein and at least one gas orifice structured to fluidly connect the combustion prechamber to a cylinder in the internal combustion engine, and the igniter further having a hydraulic chamber formed therein;

the igniter further including a piston having a piston end face exposed to the combustion prechamber, and a hydraulic actuation surface exposed to the hydraulic chamber and positioned opposite to the piston end face, and the piston is movable within the igniter housing between a retracted position and an advanced position; and a hydraulic actuator structured to apply an actuating force to the piston, such that the piston is moved toward the advanced position to increase a pressure of an ignition charge of fuel and air within the combustion prechamber to an autoignition threshold; and a control valve assembly resident in the igniter to fluidly connect the hydraulic chamber in the igniter to a supply of pressurized hydraulic fluid.

2. The ignition system of claim 1 wherein the igniter housing includes a nozzle forming the combustion prechamber and having a plurality of gas orifices formed therein, and wherein the piston end face is spaced from the plurality of gas orifices at the advanced position such that the plurality of gas orifices are open to the combustion prechamber at the advanced position.

3. The ignition system of claim 2 further comprising a biaser biasing the piston toward the retracted position in opposition to the actuating force.

4. The ignition system of claim 3 wherein the piston end face is within the nozzle at each of the retracted position and the advanced position, and the biaser is held in compression in the igniter housing, and is compressed in response to moving the piston from the retracted position toward the advanced position.

5. The ignition system of claim 4 wherein the piston includes a first piston head including the piston end face, and a second piston head coupled to the first piston head, and the igniter further includes a piston guide attached to the piston between the first piston head and the second piston head and slidable in contact with the igniter housing.

6. The ignition system of claim 2 wherein the piston further includes a piston ring attached to the piston and limiting blowby of combustion gases between the piston and the nozzle, and the igniter housing has a blowby vent formed therein for venting blowby gases out of the igniter.

7. The ignition system of claim 1 wherein the hydraulic actuator further includes a hydraulic fluid port formed therein, and the control valve is movable between an open position where the hydraulic fluid port is fluidly connected to the hydraulic chamber, and a closed position, and an electrical actuator coupled with the control valve.

8. An internal combustion engine comprising:
a fuel supply;
an engine housing having a main combustion chamber formed therein;
an ignition system including an igniter having a combustion prechamber formed therein, and at least one gas orifice fluidly connecting the combustion prechamber to the main combustion chamber;
the igniter further including a piston having a piston end face exposed to the combustion prechamber, and being movable within an igniter housing between a retracted position and an advanced position; and
the ignition system further including a hydraulic actuator structured to apply an actuating force to the piston, such that the piston is moved toward the advanced position to increase a pressure of an ignition charge of fuel and air within the combustion prechamber to an autoignition threshold;
the igniter further including a hydraulic chamber formed therein, and the piston further includes a hydraulic actuation surface exposed to the hydraulic chamber and positioned opposite to the piston end face;
the hydraulic actuator further including a hydraulic fluid port formed therein, and a control valve assembly having a control valve movable between an open position where the hydraulic fluid port is fluidly connected to the hydraulic chamber, and a closed position;
the control valve including a valve body resident in the igniter, and having a valve seat formed therein; and
the control valve including a poppet control valve member that blocks the valve seat at the closed position.

9. The internal combustion engine of claim 8 wherein the piston in the igniter reciprocates in line with a piston in the main combustion chamber, and the igniter further includes a biaser biasing the piston in the igniter toward the retracted position in opposition to the actuating force.

10. The internal combustion engine of claim 8 wherein the piston includes a piston head and the piston end face is formed on the piston head, and the piston includes a piston ring attached to the piston head.

11. The internal combustion engine of claim 10 wherein the igniter housing having a nozzle, and the piston is within the nozzle at each of the retracted position and the advanced position.

12. A method of operating an engine comprising:
moving an engine piston in an engine toward a top dead center position to increase a pressure of a main charge of fuel and air in a main combustion chamber;
fluidly connecting a hydraulic chamber in an igniter to a supply of pressurized hydraulic fluid;
applying a pressure of the pressurized hydraulic fluid to a hydraulic actuation surface of an igniter piston exposed to the hydraulic chamber to cause the igniter piston to move toward an advanced position;
increasing a pressure of an ignition charge of fuel and air in a combustion prechamber of the igniter to an autoignition threshold based on the moving of the igniter piston toward the advanced position;
conveying combustion gases of the ignition charge from the combustion prechamber into the main combustion chamber;
igniting the main charge within the main combustion chamber by way of the combustion gases of the ignition charge; and
actuating a control valve assembly resident in the igniter to fluidly connect the hydraulic chamber in the igniter to the supply of pressurized hydraulic fluid.

13. The method of claim 12 wherein the actuating of the control valve assembly further includes moving a poppet control valve from a closed position blocking a valve seat, to an open position.

14. The method of claim 12 wherein the conveying of the combustion gases of the ignition charge further includes conveying combustion gases having ignited within the combustion prechamber and forming flame jets that advance outwardly of a nozzle of the igniter exposed to the main combustion chamber.

15. The method of claim 12 further comprising limiting blowby of combustion gases past the igniter piston by way of a piston ring.

* * * * *